(12) United States Patent
Kanapathipillai et al.

(10) Patent No.: US 9,501,284 B2
(45) Date of Patent: Nov. 22, 2016

(54) MECHANISM FOR ALLOWING SPECULATIVE EXECUTION OF LOADS BEYOND A WAIT FOR EVENT INSTRUCTION

(71) Applicant: Apple Inc., Cupertino, CA (US)

(72) Inventors: Pradeep Kanapathipillai, Santa Clara, CA (US); Richard F. Russo, San Jose, CA (US); Sandeep Gupta, Santa Clara, CA (US); Conrado Blasco, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 14/502,901

(22) Filed: Sep. 30, 2014

(65) Prior Publication Data

US 2016/0092236 A1    Mar. 31, 2016

(51) Int. Cl.
  *G06F 9/38* (2006.01)
  *G06F 9/30* (2006.01)
(52) U.S. Cl.
  CPC ......... *G06F 9/3842* (2013.01); *G06F 9/30087* (2013.01); *G06F 9/3834* (2013.01); *G06F 9/3857* (2013.01)

(58) Field of Classification Search
  None
  See application file for complete search history.

(56) References Cited

U.S. PATENT DOCUMENTS

| 7,441,107 | B2 | 10/2008 | Hammond et al. |
| 7,500,087 | B2 * | 3/2009 | Saha ............... G06F 9/3004 712/235 |
| 2014/0156933 | A1 | 6/2014 | Shaikh et al. |
| 2014/0208075 | A1 | 7/2014 | McCormick, Jr. |
| 2014/0215190 | A1 | 7/2014 | Mylius et al. |

* cited by examiner

*Primary Examiner* — Cheng-Yuan Tseng
(74) *Attorney, Agent, or Firm* — Meyertons, Hood, Kivlin, Kowert & Goetzel, P.C.

(57) ABSTRACT

A processor includes a mechanism that checks for and flushes only speculative loads and any respective dependent instructions that are younger than an executed wait for event (WEV) instruction, and which also match an address of a store instruction that has been determined to have been executed by a different processor prior to execution of the paired SEV instruction by the different processor. The mechanism may allow speculative loads that do not match the address of any store instruction that has been determined to have been executed by a different processor prior to execution of the paired SEV instruction by the different processor.

20 Claims, 5 Drawing Sheets

MECHANISM FOR ALLOWING SPECULATIVE EXECUTION OF LOADS BEYOND A WAIT FOR EVENT INSTRUCTION

BACKGROUND

1. Technical Field

This disclosure relates to microprocessors, and more particularly to load and store operation ordering and speculative execution.

2. Description of the Related Art

Modern out-of-order processors are often configured to execute load and store instructions out-of-order, and also permit loads to access memory in a speculative manner. Speculatively-executed loads and stores are typically held in queues until necessary criteria is met to make the loads and stores architecturally visible (i.e., visible to software). In a multi-processor environment, the ordering rules of memory accesses by various processors is defined by the memory consistency model specified by a given instruction set architecture (ISA).

In addition, many ISAs support event-based instructions such as the Wait for Event (WEV) and the Send Event (SEV) instruction pair, for example. The WEV instruction may allow a processor to suspend its activity and possibly enter a low power state while waiting for an event generated from outside the processor. The SEV instruction allows a processor to generate an event and have it sent to all other processors in a multiprocessor system. The waiting processor may awaken upon receipt of the event generated by the SEV instruction. In out-of-order processors, it may be possible for a load that is younger than the WEV instruction to speculatively execute. However, because the WEV and SEV instruction pairs are not typically governed by any shared memory ordering rules, they require barrier instructions if they are to be ordered with respect to loads and stores. However, barrier instructions are not an efficient way to try to, nor can they necessarily guarantee the ordering rules have been followed.

SUMMARY OF THE EMBODIMENTS

Various embodiments of a system and method for allowing speculative loads beyond a wait for event instruction are disclosed. Broadly speaking, a processor includes a mechanism that checks for and flushes only speculative loads and any respective dependent instructions that are younger than an executed wait for event (WEV) instruction, and which also match an address of a store instruction that has been determined to have been executed by a different processor prior to execution of a paired set event (SEV) instruction by the different processor. The mechanism may allow to retire speculative loads that do not match the address of any store instruction that has been determined to have been executed by a different processor prior to execution of the paired SEV instruction by the different processor.

In one embodiment, a processor includes a pipeline including a load store unit having a load queue that stores speculative load instructions that have not retired. The processor also includes a reorder buffer that may store other instruction operations waiting to retire. In response to a WEV instruction becoming the oldest instruction in the reorder buffer, the reorder buffer may signal the load store unit of a possible redirect in response to determining that an event corresponding to a paired SEV instruction executed by a different processor has already been received. The load store unit may, in response to the signal, check the load queue for speculatively executed load instructions that match an address of a store instruction that has been determined to have been executed by the different processor prior to execution of the paired SEV instruction. The load store unit may also retire any speculatively executed load instructions that do not match the address of a store instruction that has been determined to have been executed by the different processor prior to execution of the paired SEV instruction. When the load store unit completes the check, the load store unit may also signal the reorder buffer to retire the WEV instruction.

In one implementation, the load store unit may also cause any matching speculatively executed load instructions to be flushed from the execution pipeline prior to signaling the reorder buffer to retire the WEV instruction.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f), interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 1:
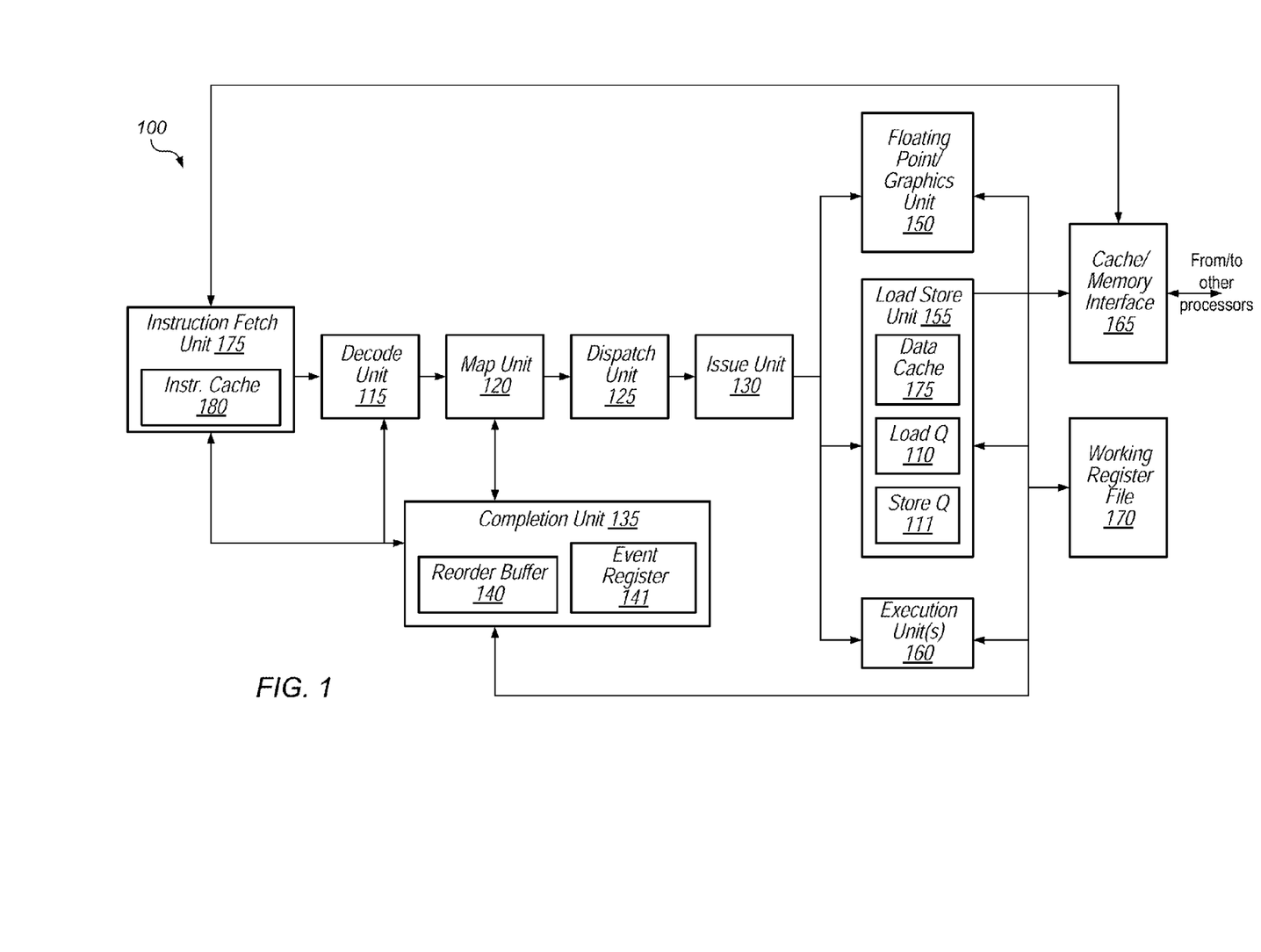
FIG. 1 is a block diagram of one embodiment of a processor.

Turning now to FIG. 1, a block diagram of one embodiment of a processor 100 is shown. Processor 100 includes instruction fetch unit (IFU) 175 which includes an instruction cache 180. IFU 175 is coupled to an various processing components that embody an instruction processing pipeline that begins with a decode unit 115 and proceeds in turn through map unit 120, dispatch unit 125, and issue unit 130. The issue unit 130 is coupled to instruction execution resources including the execution unit(s) 160, the load/store unit (LSU) 155, and the floating-point/graphics unit (FGU) 150. These instruction execution resources are also coupled to the working register file 170. Additionally, LSU 155 is coupled to cache/memory interface 165. Completion unit 135 is coupled to IFU 175, map unit 120, working register file 170, and the outputs of any number of the instruction execution resources. It is noted that the components shown in FIG. 1 are only one implementation of a processor, and that it is contemplated that in other embodiments, some components may be omitted and other components may be added. Thus, alternative configurations and variations are possible and contemplated.

The instruction fetch unit (IFU) 175 may be configured to provide instructions to the rest of the pipeline components for execution. In one embodiment, the IFU 175 may be configured to fetch instructions from an instruction cache 180 and to buffer those instructions for downstream processing, request data from a cache or memory through the cache/memory interface 165 in response to instruction cache misses, and predict the direction and target of control transfer instructions (e.g., branches).

It is noted that the concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed or retried if one or more conditions are not as speculated. In addition, the speculatively executed instructions may be held while waiting to the conditions to be fulfilled.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this example situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, the decode unit 115 may be configured to prepare fetched instructions for further processing. The decode unit 115 may be configured to identify the particular nature of an instruction (e.g., as specified by its opcode) and to determine the source and destination registers encoded in an instruction, if any. In some embodiments, the decode unit 115 may be configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given instruction set architecture (ISA). An instruction may also be defined by a microarchitecture rather than tied to a particular ISA. For example, the decode unit 115 may be configured to decode an ISA instruction into one or more micro-operations, which may also be referred to as "instructions" when they specify an operation to be performed by a processor pipeline. Thus, a "load instruction" may or may not be defined by an ISA. A load instruction includes information indicative that a load operation is to be performed and typically includes information indicating a load's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 120 may be configured to rename the architectural destination registers specified by instructions of a particular instruction set architecture (ISA) by mapping them to a physical register space, resolving false dependencies in the process.

Once decoded and renamed, instructions may be ready to be scheduled for performance. In the illustrated embodiment, the dispatch unit 125 may be configured to schedule (i.e., dispatch) instructions that are ready for performance and to send the instructions to issue unit 130. In one embodiment, the dispatch unit 125 may be configured to maintain a schedule queue that stores a number of decoded and renamed instructions as well as information about the relative age and status of the stored instructions. For example, taking instruction dependency and age information into account, dispatch unit 125 may be configured to pick one or more instructions that are ready for performance.

The issue unit 130 may be configured to provide instruction sources and data to the various execution units for picked (i.e. scheduled or dispatched) instructions. In one embodiment, the issue unit 130 may include reservation stations for storing instructions while waiting for their operands and/or for other processing resources to become available. In other embodiments, the issue unit 130 may provide instructions to reservation stations distributed among FGU 150, LSU 155, execution unit(s) 160, etc. Results may also be sourced from register files representing architectural (i.e., user-visible) as well as non-architectural state. In the illustrated embodiment, processor 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 may be similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units.

The LSU 155 may be configured to receive instruction information from the instruction processing pipeline (of which LSU 155 may be considered a part) and is coupled to a higher-level cache (relative to data cache 175) and/or a memory. Further, LSU 155 may be configured to process data memory references, such as integer and floating-point load and store instructions and other types of memory reference instructions. In the illustrated embodiment, the LSU 155 includes data cache 175, load queue 110, and store queue 111. The LSU 155 may be configured to detect misses in the data cache 175 (which may be a level 1 data cache for example) and to responsively request data from a cache or memory through cache/memory interface 165.

n some embodiments, the load queue 110 and the store queue 111 may be storage elements respectively configured to queue load and store instructions until their results can be committed to the architectural state of the processor. Instructions in the queues may be speculatively performed, non-speculatively performed, or waiting to be performed. Each queue may include a plurality of entries, which may store loads/stores in program order. However, load and store instructions may be executed out of program order earlier in the processing pipeline. In one embodiment, the load queue 110 may be configured to store information associated with load instructions. More particularly, each entry in load queue 110 may include: address information corresponding to the target location of a load, data associated with the load, and status information such as whether or not a store operation to the same target address has been received, for example.

In one embodiment, the LSU 155 may attempt to speculatively perform loads as soon as they arrive. However, the LSU 155 may retry speculatively-executed loads based on older conflicting stores and cache line migrations, for example. In some embodiments, LSU 155 may not speculatively execute loads when particular conditions persist when the loads arrive at LSU 155. Such loads may reside in load queue 110 while waiting to be performed.

As used herein, the term "conflict" refers to a situation in which memory access instructions target the same memory location in a particular order. For example, if LD_C and ST_A target the same location, and LD_C arrives at LSU 155 before ST_A, we describe LD_C as conflicting with ST_A. In one embodiment LSU 155 would speculatively perform LD_C and then replay LD_C when ST_A arrives. In another embodiment, LSU 155 would wait to perform LD_C until ST_A arrives. This situation may be referred to as a "read after write" hazard. Other types of conflicts/hazards include "write after read" and "write after write."

In various embodiments, LSU 155 may implement a variety of structures configured to facilitate memory operations. For example, LSU 155 may implement a data TLB to cache virtual data address translations. LSU 155 may also include hardware configured to support atomic load-store instructions, memory-related exception detection, read and write access to special-purpose registers (e.g., control registers), and detect memory ordering violations responsive to snoop operations, for example.

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In the illustrated embodiment, completion unit 135 includes a reorder buffer (ROB) 140 and an event register 141. The completion unit may be configured to coordinate transfer of speculative results into the architectural state of processor 100. Entries in ROB 140 may be allocated in program order. The completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as ready to complete (or "retire") when their results are allowed to be written to the architectural state. The completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying" or "retrying" as used herein, refers to re-performing a speculatively-performed or waiting instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

The events register 141 may be configured to maintain event-based information. More particularly, as described above, WEV and SEV instruction pairs may be executed. The events register 141 may keep track of the occurrence an event generated by, for example, an SEV instruction execution buy another processor or core.

Memory ordering is a common memory system requirement. For example, loads to the same memory address must be ordered with respect to each other, such that a younger load instruction never reads an "older" value of data from a given memory address when an older load to the same address reads a "newer" value. Likewise load-store operations must be ordered to enforce read after write rules to prevent a younger read to a target address from speculatively executing before an older write to a target address has occurred.

As used herein, the terms "older" and "younger" refer to relative ages of instructions in an instruction stream. Said another way, older instructions precede younger instructions in program order. For example, in the instruction stream of FIG. 3 Load1 [B] is older than Load2 [C] but younger than Load-Linked [A]. Further, "older" data refers to data associated with a relatively older instruction while "newer" data refers to data associated with a relatively younger instruction. For example, an older store may be described as having written old data to a particular location when a younger store writes new data to the particular location.

Modern microprocessors often include multiple levels of caches, as well as circuitry configured to maintain coherence among these distributed caches. Often, a processor core uses a "snoop" mechanism to enforce coherency. Snoops are requests sent from a requesting cache to a target cache to invalidate or evict a cache line from the target cache so that the requesting cache can write the cache line. In some embodiments, a snoop may indicate whether the cache line should be invalidated or evicted. A processor may be configured to replay speculatively-executed loads from migrated cache lines. Similarly, if one processor or core writes to a memory location shared by other processors, that processor may send out a snoop to all other caches (and processors) to allow any speculatively executed load operations to the same address to be flushed and retried if there is an ordering violation.

Figure 2:
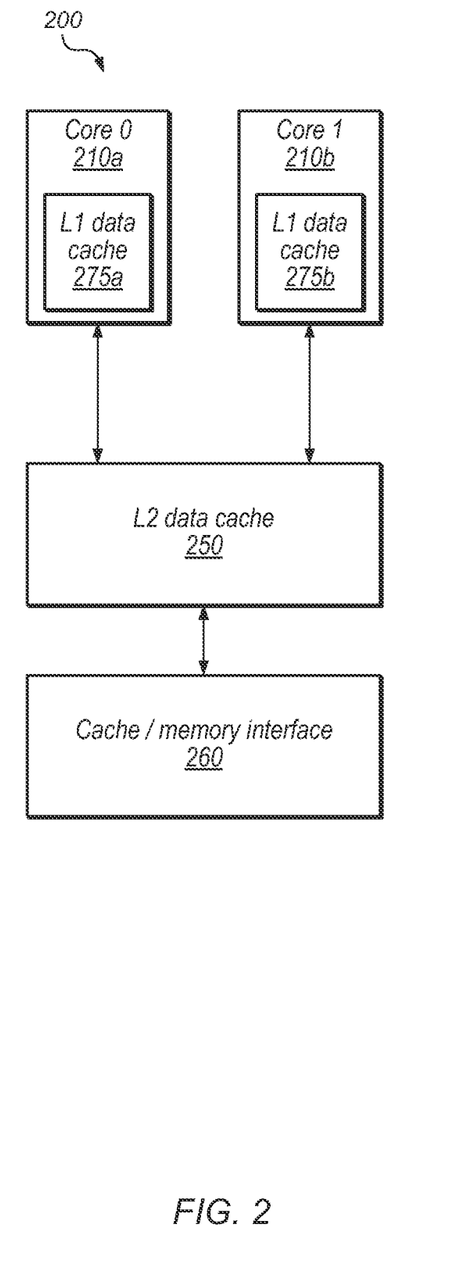
FIG. 2 is a block diagram illustrating one embodiment of a multicore processor system.

Referring now to FIG. 2, a simplified block diagram illustrating one embodiment of a processor 200 that includes multiple processing cores is shown. In the illustrated embodiment, processor 200 includes core 0 210a, core 1 210b, L2 data cache 250, and cache/memory interface 260. In various embodiments, core 0 and core 1 may reside on the same processor or on different processors. In the illustrated embodiment, core 0 and core 1 share L2 data cache 250.

Core 0 and core 1 may each include processing pipeline components such as the components shown in FIG. 1 and may be configured to execute program instructions. In the illustrated embodiment, core 0 includes L1 data cache 275a and core 1 includes L1 data cache 275b.

The L2 data cache 250 may implement a coherency policy to maintain coherency among the caches of processor 200. For example, when core 1 reads a line from L2 data cache 275, the line may be marked according to a coherency protocol. For example, the line may be marked as exclusive in a MESI scheme (modified, exclusive, shared, invalid) when only core 1 includes the line in its cache. When core 1 writes to a cache line in its cache, it may be marked as modified. In order to write to a cache line, core 1 may "snoop" core 0 to migrate the cache line from core 0 L1 data cache 275a and maintain coherency. Similarly, as described above, in multiprocessor systems any time a write operation is performed on a shared memory, a snoop may be issued to all processors and/or cores in the system. It is noted that in other embodiments, various levels and implementations of cache hierarchies may be implemented, with various snooping and coherency mechanisms.

In some embodiments, if a load is speculatively executed using data from a cache line in L1 data cache 275a and the cache line is subsequently migrated due to a store instruction executed by core 1, the load is marked as poisoned. Similarly, if a store targets a cache line in L1 data cache 275a and the cache line is subsequently migrated, the store is marked as poisoned. More particularly, in one embodiment the load queue 110 of the LSU 155 of each core may maintain an indication of whether or not the cache line has been poisoned. As such, if a cache line is written and a snoop address matches a load address sitting in the load queue 110, that entry may be marked as poisoned.

As mentioned above, in an out of order processor, it may be beneficial to speculatively execute load instructions that are younger than a WEV instruction. In such cases, it may be possible for a load operation speculatively executed on one core to be poisoned by a store executed by another core. Thus, to allow loads (and their dependent instructions) to execute beyond a WEV instruction in a multicore or multiprocessor system, a combination of mechanisms may be necessary to track the events, detecting load and store ordering violations, and control WEV processing ordering.

Figure 3:
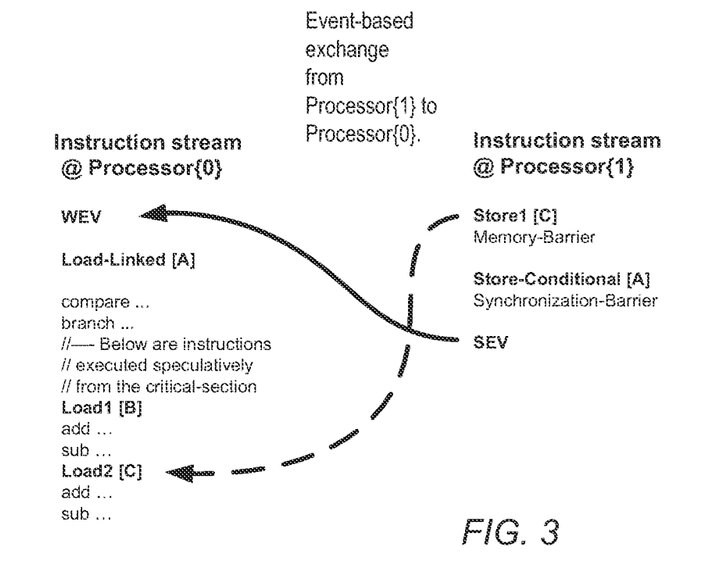
FIG. 3 is a diagram depicting an embodiment of an instruction stream execution sequence between the processor cores of FIG. 2.

Referring to FIG. 3, a diagram depicting an embodiment of an instruction stream execution sequence between two processors is shown. The instruction stream on the left is an example instruction stream being executed by, for example, processor core 0 of FIG. 2, while the instruction stream on the right is an example instruction stream being executed by, for example, processor core 1 of FIG. 2. The instruction stream on the left includes a WEV instruction followed by a number of younger load instructions and some other various instructions. The square brackets having a letter are indicative of the load target memory address. The instruction stream on the right includes a pair of store instructions and an SEV instruction. The solid curved arrow links the SEV instruction to the WEV instruction and the dashed curved arrow identifies a store operation to a location that has already been read by the younger load to the same location, which is therefore poisoned.

Figure 4:
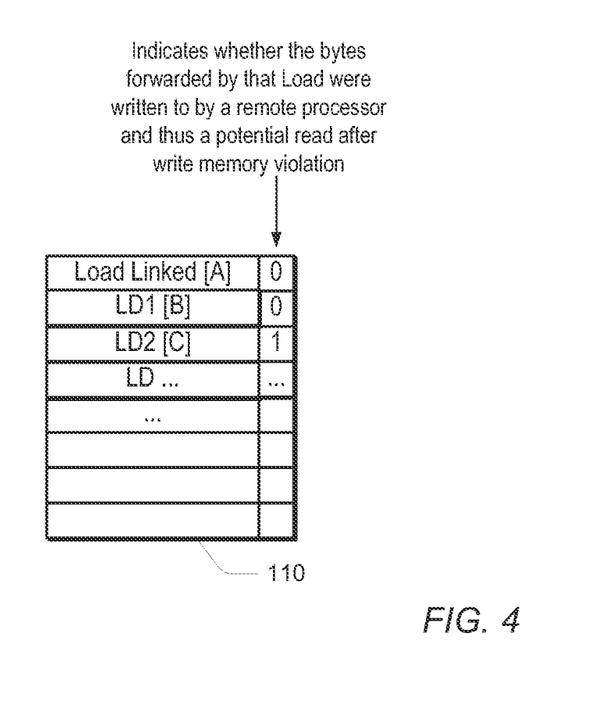
FIG. 4 is a diagram depicting one embodiment of the load queue of FIG. 1.

In FIG. 4, one embodiment of load queue 110 of FIG. 1 is shown. In the illustrated embodiment, the load queue 110 includes a number of entries. Each entry may be configured to store a load operation that has not been retired along with the corresponding target memory address. In addition, each entry also includes a poison indication that indicates whether or not the target address of the load operation in the entry has been written to by an older store operation performed by a remote processor.

In the illustrated embodiment, a value of zero in a given entry indicates that the load operation in that given entry has not been written to, and thus poisoned. If however, the indication is a value of one, the load operation in that given entry has been written to by an older write and the load is therefore poisoned. In such a case, the instruction pipeline may be flushed beginning with the poisoned instruction and all instructions that follow it. Those instructions may be scheduled to be replayed at a later time.

In one embodiment, the load queue 110 may include a content addressable memory (CAM) structure (not shown) which may be used to search for matching load addresses upon receipt of a snoop having a particular address. Accordingly, if a snoop address matches an address of a speculatively executed load instruction in the load queue 110, the poison indication of the corresponding entry is asserted to indicate that the target address of that load instruction has been written to by an older store instruction and is thus poisoned. Accordingly, in FIG. 4, the load instructions from the instruction stream of processor core 0 shown in FIG. 3 are in the load queue 110 as speculative loads. When the Store1 [C] instruction was executed by processor core 1 in FIG. 3, a snoop request including address [C] was received by LSU 155 of processor core 0. The address [C] matched the LD[C] operation in the load queue 110 of FIG. 4, and the poison bit was set.

Figure 5:
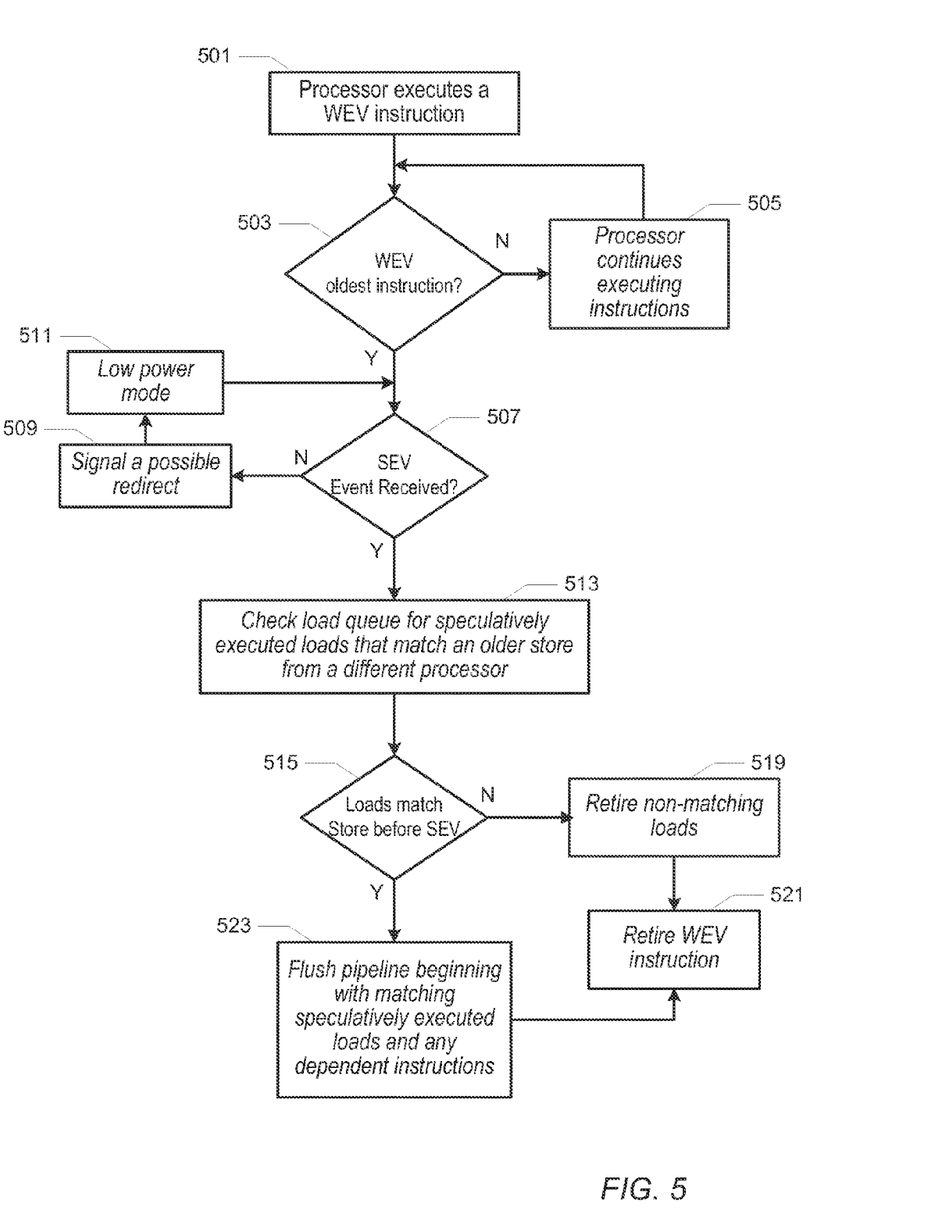
FIG. 5 is a flow diagram describing operational aspects of the processors shown in FIG. 1 and FIG. 2.

FIG. 5 is a flow diagram describing operational aspects of the processor pipeline of FIG. 1 and FIG. 2. Referring collectively now to FIG. 1 through FIG. 5 and beginning in block 501 of FIG. 5, during operation of the processor 100, for example, the processor 100 may be trying to access a shared memory location that has been locked. Accordingly, the processor 100 executes a WEV instruction. In one embodiment, if the WEV instruction is not the oldest operation in the reorder buffer 140 (block 503), the processor 100 continues executing instructions (block 505). However, when the WEV instruction becomes the oldest operation in the reorder buffer 140 (block 503), in one embodiment the completion unit 135 checks the event register 141 to determine if an event corresponding to the execution of an SEV instruction by another processor has already been received by the processor 100 (block 507). If the event corresponding to the SEV instruction has not been received, the reorder buffer 140 may signal a possible redirect to the LSU 155 (block 509). The processor 100 may then wait for the event corresponding to the SEV instruction by entering a low power mode (block 511) in which at least a portion of the processor 100 may be powered down, clock gated, or both.

In one embodiment completion unit 135, or at least portions of it, may continue to receive events and may wake up the processor 100 in response to the event corresponding to the SEV instruction being received. Once awake, the LSU 155 may respond to the redirect signal by checking the load queue 110 for any speculatively executed loads that have been poisoned by, for example, a snoop address from a store operation on another processor matching and an address in the load queue 110 (513). If there are no poisoned loads (matching any snoop addresses), the speculatively executed load operations that are younger than the WEV instruction may be retired (519). The LSU 155 may notify the reorder buffer 140, and the WEV instruction may be retired (block 521).

Referring back to block 515, if there are loads that have been poisoned, the LSU 155 may cause those matching load instructions and any dependent instructions to be flushed from the load queue 110 and the pipeline, and subsequently replayed (block 523).

In some cases, the processor owning the memory lock may have released the lock close to the time that the requesting processor is executing the WEV instruction to wait for the event. In such cases, the event may be in the event register. In these cases it is unlikely that any store operations have poisoned the speculatively executed loads, so it is worthwhile to check, rather than simply flushing them from the pipeline. Accordingly, referring back to block 507, if the event corresponding to the execution of the SEV instruction by another processor has already been received by the processor 100, the completion unit 135 may signal a possible redirect to check for any poisoned speculatively executed loads as described above in conjunction with the description of block 513. Likewise, any poisoned loads may be flushed along with their dependent instructions, and non-matching loads may be retired. The WEV instruction may then be retired from the reorder buffer 140.

In one embodiment, the WEV instruction may be implemented by issuing two micro-operations such as WEV0 and WEV1, for example. More particularly, upon decoding of the WEV instruction by the decode unit 115 for example, the WEV instruction may be issued as WEV0 and WEV1. Accordingly, while the instruction flow order shown in FIG. 5 may be followed, it is implemented using the two micro-operations as described below.

In one embodiment, the WEV0 is dispatched to one pipeline and it issues when it is the oldest instruction in the reorder buffer 140. However, the WEV1 micro-op is dispatched to the load store pipeline to await issue. When WEV0 issues, the completion unit 135 checks the event register 141 for the event corresponding to the paired SEV instruction.

If the event has been received, the WEV0 is converted to a NOP instruction, and is completed (retired) in the reorder buffer 140. Upon completion of WEV0, the reorder buffer 140 signals the LSU 155 to process the WEV1. When the WEV1 is next to retire in the reorder buffer 140 the LSU 155 processes the WEV1 by examining the load queue 110 for any poisoned younger speculatively executed loads. If any are found, the LSU 155 signals the pipeline to flush and replay the younger loads and any dependent instructions. The LSU 155 may then signal the reorder buffer 140 to retire the WEV1 micro-op.

If the event has not been received, in one embodiment, a pending redirect may be marked in the pipeline. WEV0 may be retired and the processor 100 may enter a low power mode. Upon awakening, WEV1 may be processed. Similar to above, the LSU 155 processes the WEV1 by examining the load queue 110 for any poisoned younger speculatively executed loads. If any are found, the LSU 155 signals the pipeline to flush and replay the younger loads and any dependent instructions. The LSU 155 may then signal the reorder buffer 140 to retire the WEV1 micro-op.

Figure 6:
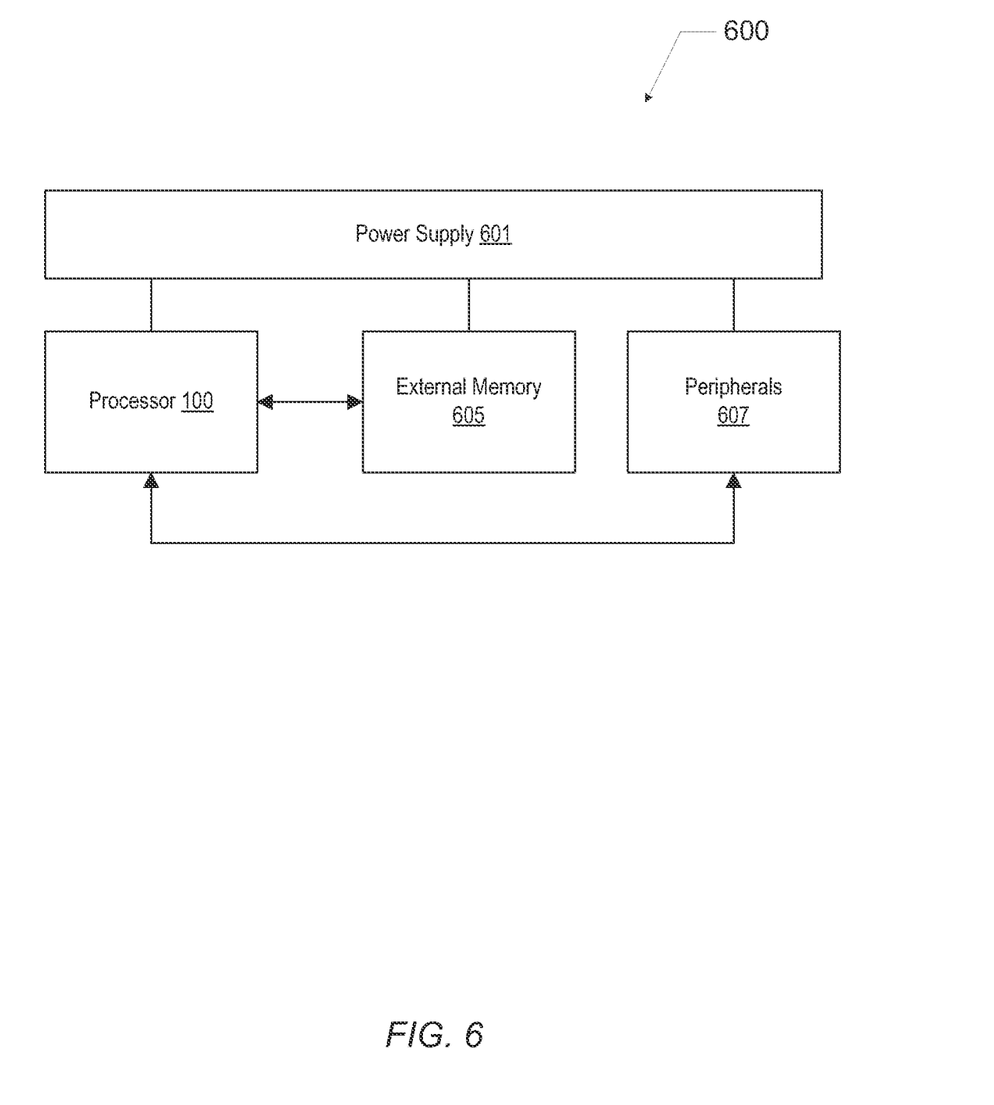
FIG. 6 is a block diagram of one embodiment of a system including the processor of FIG. 1.

Turning to FIG. 6, a block diagram of one embodiment of a system that includes the processor of FIG. 1 is shown. The system 600 includes at least one instance of the processor 100 of FIG. 1 coupled to one or more peripherals 607 and a system memory 605. The system 600 also includes a power supply 601 that may provide one or more supply voltages to the processor 100 as well as one or more supply voltages to the memory 605 and/or the peripherals 607. In some embodiments, more than one instance of the processor 100 may be included.

The peripherals 607 may include any desired circuitry, depending on the type of system. For example, in one embodiment, the system 600 may be included in a mobile device (e.g., personal digital assistant (PDA), smart phone, etc.) and the peripherals 607 may include devices for various types of wireless communication, such as WiFi, Bluetooth, cellular, global positioning system, etc. The peripherals 607 may also include additional storage, including RAM storage, solid-state storage, or disk storage. The peripherals 607 may include user interface devices such as a display screen, including touch display screens or multitouch display screens, keyboard or other input devices, microphones, speakers, etc. In other embodiments, the system 600 may be included in any type of computing system (e.g. desktop personal computer, laptop, workstation, net top etc.).

The system memory 605 may include any type of memory. For example, as described above in conjunction with FIG. 1, the system memory 605 may be in the DRAM family such as synchronous DRAM (SDRAM), double data rate (DDR, DDR2, DDR3, etc.), or any low power version thereof. However, system memory 605 may also be implemented in static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
an execution pipeline including a load store unit having a load queue configured to store speculative load instructions that have issued but have not retired, wherein the execution pipeline is configured to execute a wait for event (WEV) instruction;
a reorder buffer coupled to the execution pipeline and configured to store instruction operations waiting to retire;
wherein in response to the WEV instruction becoming an oldest instruction in the reorder buffer, the reorder buffer is configured to signal the load store unit of a possible redirect in response to determining that an event corresponding to a paired set event (SEV) instruction executed by a different processor has been received;
wherein in response to the signal, the load store unit is configured to:
check the load queue for speculatively executed load instructions that match an address of a store instruction that has been determined to have been executed by the different processor prior to execution of the paired SEV instruction;
retire any speculatively executed load instructions that do not match an address of a store instruction that has been determined to have been executed by the different processor prior to execution of the paired SEV instruction; and
signal the reorder buffer to retire the WEV instruction in response to the load store unit completing the check of the load queue.

2. The processor of claim 1, wherein the load store unit is further configured to cause any matching speculatively executed load instructions to be flushed from the execution pipeline prior to signaling the reorder buffer to retire the WEV instruction.

3. The processor of claim 1, wherein the reorder buffer is further configured to:
signal the load store unit of a possible redirect in response to determining that the event corresponding to the paired SEV instruction executed by a different processor has not been received;
cause the execution pipeline to wait for the paired SEV instruction; and
retire the WEV instruction subsequent to determining that the event corresponding to the paired SEV instruction executed by a different processor has been received, and subsequent to the load store unit completing the check of the load queue.

4. The processor of claim 3, wherein in response to the possible redirect signal, the load store unit is configured to:
check the load queue for a speculatively executed load instruction that matches an address of a store instruction that has been determined to have been executed by the different processor prior to execution of the paired SEV instruction;
cause any matching speculatively executed load instructions to be flushed from the execution pipeline prior to signaling the reorder buffer to retire the WEV instruction.

5. The processor of claim 3, wherein in response to determining that the event corresponding to the paired SEV instruction executed by a different processor has not been received, at least portions of the processor wait in a low power state for the paired SEV instruction.

6. The processor of claim 1, wherein the execution pipeline is further configured to decode and issue the WEV instruction as a first micro-operation and a second micro-operation, wherein in response to the first micro-operation becoming the oldest operation, the reorder buffer is configured to determine whether an event corresponding to the paired SEV instruction executed by a different processor has been received.

7. The processor of claim 6, wherein the reorder buffer is further configured to convert the first micro-operation into a NOP instruction in response to determining that the event corresponding to the paired SEV instruction executed by a different processor has been received, to signal the load store unit to process the second micro operation, and to retire the first micro-operation.

8. The processor of claim 7, wherein in response to receiving the signal to process the second micro operation, the load store unit is further configured to check the load queue for a speculatively executed load instruction that matches the address of a store instruction that has been determined to have been executed by the different processor prior to execution of the paired SEV instruction.

9. The processor of claim 6, wherein the reorder buffer is further configured to signal the load store unit of a pending redirect in response to determining that the event corresponding to the paired SEV instruction executed by a different processor has not been received, and to cause at least portions of the processor to wait in a low power state for the paired SEV instruction.

10. The processor of claim 9, wherein in response to coming out of the low power state, the reorder buffer is configured to signal the load store unit to process the second micro operation, and to retire the first micro-operation.

11. A method comprising:
executing, by a processor execution pipeline, a wait for event (WEV) instruction;
wherein in response to the WEV instruction becoming an oldest instruction, and in response to determining that an event corresponding to paired set event (SEV) instruction executed by a different processor has been received, processor control logic:
checking for speculatively executed load instructions that match an address of a store instruction that has been determined to have been executed by the different processor prior to execution of the paired SEV instruction;
retiring speculatively executed load instructions that do not match an address of a store instruction that has been determined to have been executed by the different processor prior to execution of the paired SEV instruction; and retiring the WEV instruction.

12. The method of claim 11, further comprising flushing instructions from the processor execution pipeline beginning with a speculatively executed load instruction that matches an address of a store instruction that has been determined to have been executed by the different processor prior to execution of the paired SEV instruction.

13. The method of claim 11, further comprising in response to determining that the event corresponding to the paired SEV instruction executed by a different processor has not been received:

signaling a redirect;

waiting for the paired SEV instruction;

retiring the WEV instruction subsequent to receiving the paired SEV instruction, and subsequent to completing the checking for speculatively executed load instructions that match an address of a store instruction that has been determined to have been executed by the different processor prior to execution of the paired SEV instruction.

14. The method of claim 13, further comprising, in response to the redirect signaling, flushing instructions from the processor execution pipeline beginning with the speculatively executed load instruction that matches an address of a store instruction that has been determined to have been executed by the different processor prior to execution of the paired SEV instruction.

15. The method of claim 13, further comprising at least portions of the processor waiting in a low power state for the paired SEV instruction in response to determining that the event corresponding to the paired SEV instruction executed by a different processor has not been received.

16. The method of claim 11, further comprising decoding and issuing the WEV instruction as a first micro-operation and a second micro-operation, wherein in response to determining that an event corresponding to the paired SEV instruction executed by a different processor has been received, converting the first micro-operation into a NOP instruction, retiring the first micro-operation, and subsequently processing the second micro-operation.

17. The method of claim 16, wherein processing the second micro-operation includes flushing instructions from the processor execution pipeline beginning with a speculatively executed load instruction that matches an address of a store instruction that has been determined to have been executed by the different processor prior to execution of the paired SEV instruction.

18. The method of claim 16, further comprising signaling a pending redirect, and causing at least portions of the processor to wait in a low power state for the paired SEV instruction in response to determining that the event corresponding to the paired SEV instruction executed by a different processor has not been received.

19. The method of claim 18, wherein in response to coming out of the low power state resulting from receiving the SEV instruction, processing the second micro operation and retiring the first micro-operation.

20. A processor comprising:

an execution pipeline including a load store unit configured to store speculatively executed load instructions that have issued but have not retired;

a reorder buffer coupled to the execution pipeline and configured to store instruction operations waiting to retire;

wherein in response to a wait for event (WEV) instruction becoming an oldest instruction in the reorder buffer, the reorder buffer is configured to signal the load store unit of a possible redirect in response to determining that an event corresponding to a paired set event (SEV) instruction executed by a different processor has been received;

wherein in response to the signal, the load store unit is configured to:

check for any speculatively executed load instructions match an address of a store instruction that has been determined to have been executed by the different processor prior to execution of the paired SEV instruction;

retire any non-matching speculatively executed load instructions; and signal the reorder buffer to retire the WEV instruction subsequent to completing the check.

* * * * *